US 7,725,606 B2

United States Patent
Lev-Ami et al.

(12) United States Patent
(10) Patent No.: US 7,725,606 B2
(45) Date of Patent: *May 25, 2010

(54) METHOD AND APPARATUS FOR TWO PHASE STRUCTURED MESSAGE TO TAGGED MESSAGE TRANSLATION

(75) Inventors: Uzi Lev-Ami, Hod-Hasharon (IL); Tal Lev-Ami, Hod-Hasharon (IL); Ezra Shabi, Modiin (IL); Yoav Sherf, Holon (IL)

(73) Assignee: MKS Instruments, Inc., Andover, MA (US)

( * ) Notice: Subject to any disclaimer, the term of this patent is extended or adjusted under 35 U.S.C. 154(b) by 912 days.

This patent is subject to a terminal disclaimer.

(21) Appl. No.: 11/479,151

(22) Filed: Jun. 30, 2006

(65) Prior Publication Data
US 2007/0061489 A1   Mar. 15, 2007

Related U.S. Application Data

(63) Continuation of application No. 09/847,937, filed on May 2, 2001, now Pat. No. 7,072,985.

(51) Int. Cl.
*G06F 15/16* (2006.01)
(52) U.S. Cl. ............... 709/246; 709/206; 709/232; 709/207; 715/234; 715/239
(58) Field of Classification Search ................ None
See application file for complete search history.

(56) References Cited

U.S. PATENT DOCUMENTS

| | | | |
|---|---|---|---|
| 4,829,445 A | 5/1989 | Burney | |
| 5,805,442 A | 9/1998 | Crater et al. | |
| 6,446,110 B1 | 9/2002 | Lection et al. | |
| 6,519,617 B1 | 2/2003 | Wanderski et al. | |
| 6,604,115 B1 | 8/2003 | Gary, Jr. et al. | |
| 6,738,759 B1 | 5/2004 | Wheeler et al. | |
| 6,757,714 B1 * | 6/2004 | Hansen | 709/206 |
| 6,782,403 B1 | 8/2004 | Kino et al. | |
| 6,804,677 B2 * | 10/2004 | Shadmon et al. | 715/239 |
| 6,826,553 B1 | 11/2004 | DaCosta et al. | |
| 6,854,120 B1 | 2/2005 | Lo et al. | |
| 6,996,776 B1 * | 2/2006 | Makely et al. | 715/207 |

(Continued)

OTHER PUBLICATIONS

Dourish, Paul et al. "Extending document management systems with user-specific active properties." Transactions on Information Systems. vol. 18, Issue 2. Apr. 2000. ACM Press. 140-170.*

(Continued)

*Primary Examiner*—Rupal D Dharia
*Assistant Examiner*—Jeffrey R Swearingen
(74) *Attorney, Agent, or Firm*—Ernest J. Beffel, Jr.; Haynes Beffel & Wolfeld LLP

(57) ABSTRACT

An aspect of the present invention includes a method and device for translating a structured message into a context tagged, XML message. A two step translation is described, first including translation from structured message to structure tagged message, and then from structure tagged message to context tagged message. Standard tools may be used in the second step to apply validations or business logic. Particular aspects of the present invention are described in the claims, specification and drawings.

6 Claims, 2 Drawing Sheets

U.S. PATENT DOCUMENTS

| | | | |
|---|---|---|---|
| 7,072,985 B1 * | 7/2006 | Lev-Ami et al. | 709/246 |
| 7,426,721 B1 * | 9/2008 | Saulpaugh et al. | 717/144 |
| 7,519,903 B2 * | 4/2009 | Yahagi | 715/234 |
| 2004/0015840 A1 * | 1/2004 | Walker | 717/108 |
| 2004/0123302 A1 | 6/2004 | Lo et al. | |

OTHER PUBLICATIONS

Consilium, "White Paper: Overall Equipment Effectiveness," http://www.consilium.com/white.sub.—oee.html, 1998-2000, 12 pages, Consilium, Inc.

GW Associates, Inc., "GWconX300 Communications Software for 300mm Equipment Data Sheet," 2001, 3 pages, USA.

GW Associates, Inc., "SDR SECS Driver Software," http://www.gwainc.com/products/sdr.htm, 6 pages.

IPC, "MyFab2k.com," http://www.ipc-kallenz.de/, 3 pages.

Prof. Dr.-Ing. K. Estschberger, "Controller Area Network—Introduction," http://www.ixxat.de/english/knowhow/literatur/can.shtml, 2000, 10 pages, IXXAT Automation GmbH.

J. Moyne, N. Najafi, D. Judd, and A. Stock, "Analysis of Sensor/Actuator Bus Interoperability Standard Alternatives for Semiconductor Manufacturing," Published in Sensors Expo Conference Proceedings, Sep. 1994, 13 pages.

"MyFab2k-tour," http://www.ipc-kallmuenz.de/tour1.htm, 6 pages.

SEMI E37-0298, "High-Speed SECS Message Services (HSMS) Generic Services," 1995/1998, 24 pages, Semiconductor Equipment and Materials International (SEMI).

SEMI E4-0699, "SEMI Equipment Communications Standard 1 Message Transfer (SECS-I)," 1980/1999, 20 pages, Semiconductor Equipment and Materials International (SEMI).

SEMI E5-0600, "SEMI Equipment Communications Standard 2 Message Content (SECS-II)," 1982/2000, pp. 1-15, 92-93, Semiconductor Equipment and Materials International (SEMI).

SEMI E54-0997, "Sensor/Actuator Network Standard," 1997, 10 pages, Semiconductor Equipment and Materials International (SEMI).

SI Automation, "The SECS Pack—Product Summary/The Silverbox—Product Summary," http://www.siautomation.com/index1.html, 2000, 4 pages.

P. Singer, "E-Diagnostics: Monitoring Tool Performance," Cahners Semiconductor International, http://www.semiconductor.net/semicondutor/issues/issues/2001/200103/six01- 0301supp.asp, 2001, 9 pages.

Symphony Systems, "Symphony Systems Effective Productivity Solutions (EPS)," http://www.symphony-systems.com/products/, 10 pages.

* cited by examiner

METHOD AND APPARATUS FOR TWO PHASE STRUCTURED MESSAGE TO TAGGED MESSAGE TRANSLATION

PRIORITY INFORMATION

This application is a continuation of U.S. patent application Ser. No. 09/847,937, now U.S. Pat. No. 7,072,985, entitled "Method and Apparatus for Two Phase Structured Message to Tagged Message Translation" filed on 2 May 2001 by Uzi Lev-Ami, Tal Lev-Ami, Ezra Shabi and Yoav Sherf.

BACKGROUND OF THE INVENTION

The protocols used by tools and other automated or semi-automated equipment in semi conductor fabs, metal cutting shops, healthcare and other domains developed over the years, when communication and processor speeds were relatively limited. Message protocols for foundry, shop floor and healthcare applications were designed to utilize low-speed, serial communications. These message protocols included structured messages, which could be transmitted quickly even with low-speed communications. Structured messages were and remain difficult to translate and understand. The difficulty is exacerbated when a first message sets a context for a response and a second, responsive message does not repeat the context; that is, the context-sensitive response is only meaningful when paired with the corresponding context-setting message. Matching context-setting and context-sensitive messages can be a very tedious task, especially when the context-setting-messages precede the context-setting messages by hours, days or weeks, instead of immediately preceding the responsive messages.

Therefore, it is desirable to introduce methods and devices for translating structured messages into tagged messages, such as XML messages, and particularly into context-insensitive tagged messages. It is also desirable to match context-setting and context-sensitive messages and generate context-insensitive messages.

SUMMARY OF THE INVENTION

An aspect of the present invention includes a method and device for translating a structured message into a context tagged, XML message. A two step translation is described, first including translation from structured message to structure tagged message, and then from structure tagged message to context tagged message. Standard tools may be used in the second step to apply validations or business logic. Particular aspects of the present invention are described in the claims, specification and drawings.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Figure 1:
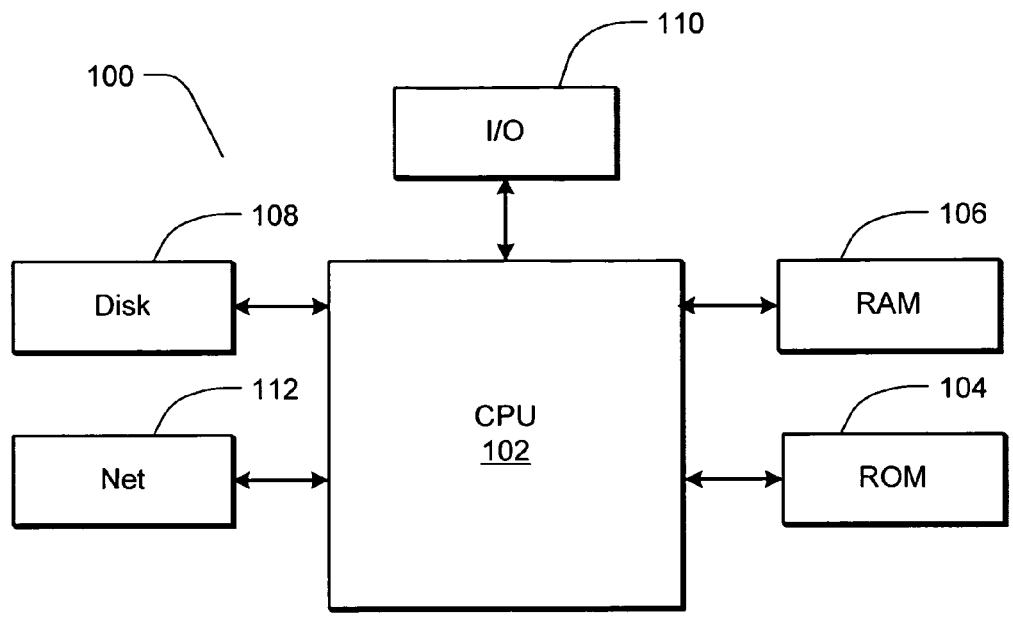
FIG. 1 is a block diagram of a system used to demonstrate aspects of the present invention.

FIG. 1 is a block diagram of a general-purpose computer 100 which may be used to practice aspects in the present invention. The computer includes a CPU 102, which can read from a read only memory 104, which can read from and write to a random access memory 106, which can read from or write to a disk storage system 108, which can communicate across a network connection 112, and which can receive and send data via input output ports 110. Programs and routines may be stored on the disk storage, not depicted, either a fixed or removable disk, be read into random access memory 106 and be executed on the CPU 102. The output of a routine running on the CPU may be input to a subsequent routine. The output of a routine may be data stored in random access memory, data stored on the disk storage system, data communicated via network connection, or data communicated across the output port. Similarly, the output of one part of a routine running on the CPU may be input to a subsequent part of same routine.

Figure 2A:
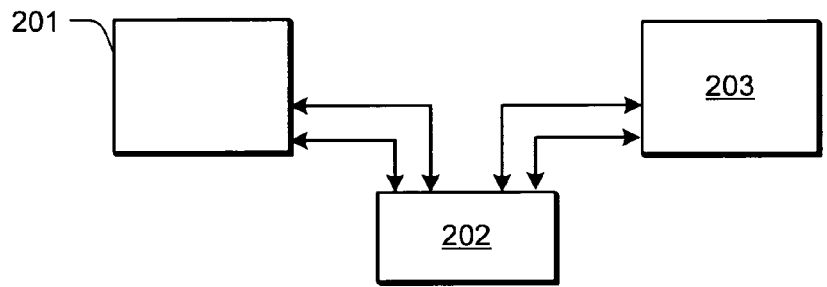
FIG. 2A-2C are block diagrams of configurations and modes for listening to communications among devices.
Figure 2B:
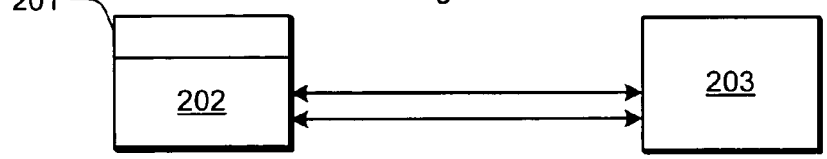
Figure 2C:
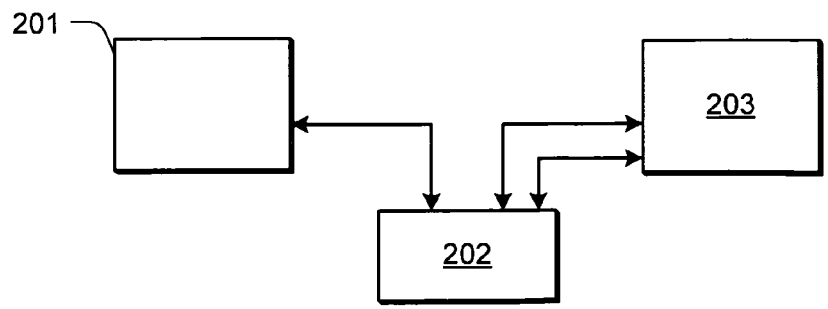

Some arrangements for practicing the present invention are illustrated in FIGS. 2A-2C. At least one machine 203 communicates with a host 201. The host may be a controller or a management system for one or more machines. Software implementing aspects of the present invention may run 202 on the host (FIG. 2B), on other equipment that listens to communications between the host and the machine (FIG. 2A), or on other equipment that has host-like capabilities (FIG. 2C). The equipment with host-like capabilities may translate messages from a serial protocol to a network protocol or among other types of communication or transport protocols. The communications between the host and machine include a series of structured messages, for instance untagged messages constructed according to a standard or protocol. These messages may include both context-setting and context-sensitive messages, which sometimes are inquiries and responses. Context-sensitive response messages may omit the inquiries to which they respond. For instance, a context-setting message may ask for read-outs of four variables that the machine monitors. The context-sensitive message may respond with read-out values for the four variables, without identifying the variables being reported. Alternatively, one or more context-setting messages may define at least one report and at least one report triggering event. When the machine senses occurrence of the triggering event or when the report is specifically requested, it may issue the report. The report may take the form of read-out values for a plurality of variables, without identifying the variables being reported.

The machines may be semiconductor manufacturing equipment in a clean room, numerically controlled equipment in a machine shop, or any other automated or semi-automated equipment. The machines may be standalones, machines connected by robot work piece handlers, or fully integrated multi-station work cells. Each machine may have its own controller or a plurality of machines may share a controller. Similarly, devices used for or in the business of healthcare may benefit from the present invention. These devices may be connected to patients or may store information regarding patients.

Communications may involve RS-232 serial communications, Ethernet connections or any other suitable communications or message transport layer. This invention may most benefit structured message protocols that were designed for slower, RS-232 serial communications, as such legacy protocols may often employ context-setting and context-sensitive messages. This invention also may apply to protocols that utilize context-insensitive messages.

One communications protocol utilizing structured messages, including context-setting and context-sensitive messages, is a SEMI Equipment Communications Standard (SECS). Two aspects of this standard, SECS-I or HSMS for message transfer and SECS-II for message content are detailed in SEMI documents E4-0699, E37-0298, and E5-0600. The SECS-I standard defines a communication interface suitable for the exchange of messages between semiconductor processing equipment and a host. Semiconductor processing equipment includes equipment intended for wafer manufacturing, wafer processing, process measuring, assembly and packaging. A host is a computer or network of computers, which exchange information with the equipment to accomplish manufacturing. The SECS-I standard includes the description of the physical connector, signal levels, data rate and logical protocols required to exchange messages between the host and equipment over a serial point-to-point data path. This standard does not define the data contained within a message. The meaning of messages must be determined through some message content standard such as SEMI Equipment Communications Standard E5 (SECS-II). These standards provide a means for independent manufacturers to produce equipment and/or hosts, which can be connected without requiring specific knowledge of each other.

HSMS is intended as an alternative to SEMI E4 (SECS-I) for applications where higher speed communication is needed or when a simple point-to-point topology is insufficient. SEMI E4 (SECS-I) can still be used in applications where these and other attributes of HSMS are not required. HSMS is also intended as an alternative to SEMI E13 (SECS Message Services) for applications where TCP/IP is preferred over OSI. It is intended that HSMS be supplemented by subsidiary standards that further specify details of its use or impose restrictions on its use in particular application domains. High-Speed SECS Message Services (HSMS) defines a communication interface suitable for the exchange of messages between computers in a semiconductor factory.

The SEMI Equipment Communications Standard Part 2 (SECS-II) defines the details of the interpretation of messages exchanged between intelligent equipment and a host. This specification was developed in cooperation with the Japan Electronic Industry Development Association Committee 12 on Equipment Communications. It was indeed to be fully compatible with SEMI Equipment Communications Standard E4 (SECS-I). It is was intended to allow for compatibility with alternative message transfer protocols. This standard defines messages to such a level of detail that some consistent host software may be constructed with only minimal knowledge of individual equipment. The equipment, in turn, may be constructed with only minimal knowledge of the host. The messages defined in the standard support the most typical activities required for integrated circuit manufacturing. The standard also provides for the definition of equipment-specific messages to support those activities not covered by the standard messages. While certain activities can be handled by common software in the host, it is expected that equipment-specific host software may be required to support the full capabilities of the equipment. SECS-II gives form and meaning to messages exchanged between equipment and host using a message transfer protocol, such as SECS-I or HSMS. SECS-II defines the method of conveying information between equipment and host in the form of messages. These messages are organized into categories of activities, called streams, which contain specific messages, called functions. A request for information and the corresponding data transmission is an example of such an activity. SECS-II defines the structure of messages into entities called items and lists of items. This structure allows for a self-describing data format to guarantee proper interpretation of the message. The interchange of messages is governed by a set of rules for handling messages called the transaction protocol. The transaction protocol places some minimum requirements on any SECS-II implementation. SECS-II applies to equipment and hosts used in the manufacturing of semiconductor devices. Examples of the activities supported by the standard are: transfer of control programs, material movement information, measurement data, summarized test data, and alarms. A given piece of equipment will require only a subset of the functions described in this standard. The number of functions and the selection of functions will depend upon the equipment capabilities and requirements. The equipment typically will define the messages used in a particular implementation of SECS-II.

The structure of the SECS messages is detailed in standards documents sometimes referred to as E4-0699 and E5-0600. The following example illustrates at least part of the structure. The header structure is adapted from E4-0699 and the data structure from E5-0600. Additional structure may be provided, for instance by a transport layer. The processing of this structured message from binary through structure-tagged format to context-insensitive tagged format follows. Consider a so-called S1, F4 (or S1F4) message. This is the Selected Equipment Status Data (SSD) message. In this message, the equipment reports the status variable value (SV) corresponding to each status variable ID (SVID) requested in the order requested, for instance, requested by sending a S1, F3 Selected Equipment Status Request (SSR). An SVID may include any parameter that can be sampled in time such as temperature or quantity of a consumable. The host needs to remember the SVIDs requested, because they are not identified in the S1F4 response message. The SECS I/II structure specified in the standards resembles the binary portion of the following:

| | |
|---|---|
| 10000000 | "Reverse bit" = 1 (equipment to host) |
| 00000000 | Device ID, e.g. ID = 0 |
| 00000001 | Wait bit = 0 (no response required), Stream = 1 |
| 00000100 | Function 4 |
| 10000000 | End bit = 1 (no blocks to follow) |
| 00000000 | Block 0 (only one block this message) |
| 00000000 | Four System Bytes, including source and transaction IDs |
| 00000010 | E.g., Source ID = 2 |
| 00000000 | |
| 10000001 | Transaction ID = 129 |
| 00000001 | List format |
| 00000011 | 3 Elements |
| 10110001 | Unsigned 4-byte integer next |
| 00000100 | Length 4 bytes |
| 00000000 | Most significant byte first |
| 00000000 | |
| 00000001 | Value = 500 |
| 11110100 | |
| 01110001 | Signed 4-byte integer next |
| 00000100 | Length 4 bytes |
| 11111111 | Twos complement format |
| 11111111 | |
| 11111111 | Value = −7 |
| 11111001 | |
| 00100001 | Binary unspecified value 1-byte next |
| 00000001 | Length 1 byte |
| 00000010 | Value = 02 |

The entire message includes 17 bytes of data, 1-byte length (not shown), 10 bytes of header and 2 bytes checksum (not shown) for a total of 30 bytes. This short a message is quickly transmitted, even at a slow serial transmission rate such as 9600 baud.

One way of representing the data section of the binary message above, consistent with the list orientation of SECS-II, follows.

```
16:40:54 Received S1F4
    <L [3]
        <U4     500>
        <I4      -7>
        <B       02>
    >
.
```

Parsing this representation, a time stamp indicates when the message was received. This time stamp can be extracted from the transport layer, can be included by the sender at the application layer, or added by the receiving or logging facility. "L [3]" indicates a list of three elements. The <elements> include a data format followed by a value. This message representation is closed with a ">" and a final "." This message is context-sensitive. It cannot be understood without knowing the inquiry that prompted the response, because it does not identify the SVIDs for which SVs are being reported.

The data portion of a context-setting messaging, which could be used to prompt the response above, can be represented as:

```
16:40:53 Sending S1F3
    <L [3]
        <U4     61>
        <U4     62>
        <U4     63>
    >
.
```

The host sent or the listening equipment received this query message at the time indicated, shortly before the S1F4 response. The host requested reports on variables identified as 61, 62, and 63. The message header included an identifier, which is not shown here, to be repeated back with the S1F4 response, to facilitate matching of the inquiry and response. One potential matching field would be a source ID plus a time stamp. If the device ID in the header were unique, then a time stamp alone would suffice. Another potential matching field would be a host identifier plus a sequence or transaction ID number. Matching the S1F3 and S1F4 messages of this example permits construction of a context-insensitive message, which identifies the variables (SVIDs) requested and the responses (SVs), as further illustrated below.

Another example of context-setting and context-sensitive messages is a sequence used to define a report, define report triggering events, and deliver a defined report after a triggering event has been sensed. Details of these messages are given in the E5-0600 document.

```
11:58:46 : Sending S2F33 [define a report]
    <L [2]
        <U4     1>
        <L [1]
            <L [2]
                <U4     7>          [report #7]
                <L [1]
                    <U4     1>      [reports one variable, #1]
                >
            >
        >
    >
.

11:58:46 : Received S2F34 [acknowledgement of S2F33]
    <B 00>
.

12:01:12 : Sending S2F35 [define link event for triggering a report]
    <L [2]
        <U4     1>
        <L [1]                      [one event trigger in this link definition]
            <L [2]
                <U4     1>          [event #1 is the trigger]
                <L [1]
                    <U4     7>      [report #7 is triggered]
                >
            >
        >
    >
.

12:01:12 : Received S2F36 [acknowledgement of S2F35]
    <B 00>
.

12:15:26 : Sending S2F37 [enabling event report]
    <L [2]
        <BOOL T>
        <L [0]
        >
    >
.

12:15:27 : Received S2F38 [acknowledgement of S2F37]
    <B 00>
.
```

```
12:02:36 : Sending S6F19 [individual report request, alternative to event
happening]
    <U4    7>              [report #7 requested]
.
12:02:37 : Received S6F20 [individual report data, responsive to S6F19]
    <L [1]
        <U4    2>          [report #7 issued (it is the value of variable #1)]
    >
.
12:15:39 : Received S6F11 [event report sent from tool, as defined
inS2F33/35]
    <L [3]
        <U4    1>
        <U4    1>          [event #1 occurred]
        <L [1]             [one report triggered]
            <L [2]
                <U4    7>  [report #7 issued]
                <L [1]
                    <U4    3>  [reported value (of variable #1) is 3]
                >
            >
        >
    >
.
12:15:39 : Sending S6F12 [acknowledgement of S2F11]
    <B 00>
.
```

In this sequence, it is useful to track the S2F37/38 pair. Logic may be included to flag, on a time-out or other basis, when a report has been defined but not enabled. The S2F37 message also illustrates reporting the message exactly, without eliminating unused fields. The S2F37 message structure specifies a list of two second level lists. One of the second level lists has no elements. This detail of the original S2F37 message is represented without modification. For some structured messages, the translation from structured to structure tagged message could include simplification of messages such as this S2F37 message.

One aspect of the present invention includes a desired format for structure tagged messages. This embodiment uses XML rules for tagging messages to represent their structure. Structure tagged messages compliant with XML can be processed using XML tools, which are available in variety. In this embodiment, an XML message may include a header with: a name field in the SECS II stream and function ("SxFy") format; a wait bit, indicating whether the recipient of the message is expected to acknowledge receipt (0 for off, 1 for on); a source ID, identifying the port that received the incoming message, or, alternatively, identifying the device that sent the message; transaction ID, identifying an open communication transaction, used for matching a response to an inquiry; and an optional header only flag, used if there is no data other than the header. The XML message further may include data, in a tree-type structure. Data nodes include a format conforming to one of the SECS-II format types, a length, and a data value.

Continuing with our examples, the following structure tagged messages are generated by processing the structured messages.

```
<Message Name="S1F4" Wbit="0" SourceID="2" TransactionID="129">
    <Structure Format="L" Length="3">
        <Value Format="U4" Length="1">500</Value>
        <Value Format="I4" Length="1">-7</Value>
        <Value Format="B" Length="1">02</Value>
    </Structure>
</Message>
<Message Name="S1F3" Wbit="1" SourceID="1" TransactionID="129">
    <Structure Format="L" Length="3">
        <Value Format="U4" Length="1">61</Value>
        <Value Format="U4" Length="1">62</Value>
        <Value Format="U4" Length="1">63</Value>
    </Structure>
</Message>
<Message Name="S2F33" Wbit="1" SourceID="1" TransactionID="257">
    <Structure Format="L" Length="2">
        <Value Format="U4" Length="1">1</Value>
        <Value Format="L" Length="1">
            <Value Format="L" Length="2">
                <Value Format="U4" Length="1">7</Value>
                <Value Format="L" Length="1">
                    <Value Format="U4" Length="1">1</Value>
                </Value>
            </Value>
        </Value>
```

-continued

```
    </Structure>
  </Message>
<Message Name="S6F11" Wbit="1" SourceID="2" TransactionID="194">
    <Structure Format="L" Length="3">
      <Value Format="U4" Length="1">1</Value>
      <Value Format="U4" Length="1">1</Value>
      <Value Format="L" Length="1">
        <Value Format="L" Length="2">
          <Value Format="U4" Length="1">7</Value>
          <Value Format="L" Length="1">
            <Value Format="U4" Length="1">3</Value>
          </Value>
        </Value>
      </Value>
    </Structure>
  </Message>
```

As these tagged messages are in XML format, those skilled in the art will be able to understand the examples without a detailed explanation.

Information from the messages themselves, both the context-setting and the context-sensitive messages, can be combined with information retrieved from a dictionary or other reference external to the translation code. A tool compliant with the SECS standards should maintain a dictionary for providing information about system variables, equipment constants, data variables, collected event IDs and alarm IDs supported by the tool. In this context, system variables describe the status of the machine. Equipment constants are user modifiable operating parameters. Data variables are measurements of process conditions at the tool or machine. Collected event IDs describe triggers for reporting conditions. Alarm IDs describe triggers for alarms. Part of the information that may be maintained in the dictionary for these items is summarized the table below.

| Item | ID | Name | Class | Format/Type | Min | Max | Default | Units | Desc |
|---|---|---|---|---|---|---|---|---|---|
| SV | ✓ | ✓ | ✓ | ✓ | N/A | N/A | N/A | ✓ | opt |
| EC | ✓ | ✓ | ✓ | ✓ | ✓ | ✓ | ✓ | ✓ | opt |
| DV | ✓ | ✓ | ✓ | ✓ | N/A | N/A | N/A | ✓ | opt |
| CEID | ✓ | opt | N/A | N/A | N/A | N/A | N/A | N/A | opt |
| ALID | ✓ | ✓ | N/A | ✓ | N/A | N/A | N/A | N/A | opt |

The potential categories of information are similar for system variables, equipment constants and data variables. An ID is a unique number typically used to access any of these three types of variables. A unique name may be assigned. The class distinguishes among variable classes (system variable, equipment constant or data variable.) The format or type is one of a set of standard formats for reporting a value. Data type and field length are part of a standard format. A standard format also may include the number of values associated with the variable, as some variables may have more than one value. For some variables, minimum values, maximum values, default values, units and extended description may be provided. The potential categories of information for events and alarms include an ID, a name and an optional description. The ID may be a sequential number. (In a broader context, variable may refer to any type of data regarding the status of a tool or any type of stored data, such as an inventory of patent MRI scans.)

It is useful in creating a dictionary to verify the correct format, type and structure of information reported by a particular machine, as machines may be less than perfectly compliant with standards. It is also useful in creating a dictionary to combine automatic inquiries to the machine with manual insertion of data in the file, especially in instances where the machine does not provide a list of variables, the machine provides only a partial list of rebels, or list provided is not compliant with a standard.

Sample dictionary entries relevant to these examples are:

```
61: Name SV_1
    Format      U4
    Length      1
    Descriptor
        Min     N/A
        Max     N/A
        Def     N/A
        Description   Describe this variable here
        Units   N/A
        Class   SV
62: Name SV_2
    Format      I4
    Length      1
    Descriptor
        Min     N/A
        Max     N/A
        Def     N/A
        Description   Describe this variable here
        Units   N/A
        Class   SV
63: Name SV_3
    Format      B
    Length      1
    Descriptor
        Min     N/A
        Max     N/A
        Def     N/A
        Description   Describe this variable here
        Units   N/A
        Class   SV
```

A further aspect of the present invention includes a desired format for context tagged messages. This embodiment uses XML rules for tagging messages to represent their structure. Each tagged message includes the two branches described in the table below:

| Branch Name | Field Name | Explanation |
| --- | --- | --- |
| Header | FormType | One of the forms: Data Form, Definition Form, Only Log Form and Time Form |
| | SECSMsg Descriptor | Stream and function of the message |
| | Descriptor | Subtype of specific Form Type |
| | Descriptor Status | Status related to specific descriptor |
| | ID | Identification related to specific descriptor |
| | IsError | Indication (true/false) whether the message contains an error indication. Messages containing an error indication (true) are only logged and their data is ignored |
| DBLogInfo | Identifier | A unique tag for database data insertion and retrieval |
| | Timestamp | The time at which the primary message related to the transaction was received. |
| | TimeFolding Ind | A time folding indication |
| | Duration | The duration (in seconds) between the primary and secondary messages related to a transaction |
| | Parameter | For future use |
| | Status type | The type of the status related to the message |
| | Status value | One of the values acceptable for the specific status type |
| | Description | Free text used in several messages for additional indications |

In addition to the Header and DBLogInfo branches described above, messages of a data or definition form can have additional branches, as described below:

| Form Name | Branch Name | Field Name | Explanation |
| --- | --- | --- | --- |
| Data | Variable | Name | Variable name |
| | | Variable ID | VID |
| | | Report ID | Report identification |
| | | Value | (See following branch) |
| | Value (sub-branch of Variable) | Name | Name of the item |
| | | Format | SECS format |
| | | Length | Number of items length = 1 means it's a leaf with data length >1 means it's a branch itself that contains array or a list of values (in a recursive manner) |
| Definition | Delete Report | Report ID | The identification of the deleted report |
| | Delete Trace | Trace ID | The identification of the deleted trace |
| | Delete Event Link | Event ID | The identification of the deleted event |
| | Define Report | Report ID | The identification of the defined report |
| | | Variable | Actually a branch(es) that holds a VID |
| | Define Trace | Trace ID | The identification of the defined trace |
| | | Variable | Actually a branch(es) that holds a VID |
| | Define Event Link | Event ID | The identification of the linked event |
| | | Variable | Actually a branch(es) that holds report ID |
| | Delete All Reports | | No parameters |
| | Delete All Traces | | No parameters |
| | Delete All Event Links | | No parameters |

Continuing with some of the examples above, the process of matching context-setting and context-sensitive messages and expanding them against the dictionary produces the following:

```
<SECSMessage>
    <Header ID="#" IsError="false" SECSMsg="S1F3" FormType="DataForm"
    Descriptor="QuerySimple" DescriptorState="#"/>
    <DBLogInfo Duration="0" Parameter="#" TimeStamp="14-Feb-2001
    16:40:36" Identifier="3726866688" StatusType="#" Description="#"
    StatusValue="#" TimeFoldingInd="false"/>
    <Variable Name="SV_1" VariableID="61">
        <Value Name="SV_1" Format="U4" Length="1">500</Value>
    </Variable>
    <Variable Name="SV_2" VariableID="62">
        <Value Name="SV_2" Format="I4" Length="1">-7</Value>
    </Variable>
    <Variable Name="SV_3" VariableID="63">
        <Value Name="SV_3" Format="B" Length="1">02</Value>
    </Variable>
</SECSMessage>
<SECSMessage>
    <Header ID="#" IsError="false" SECSMsg="S2F33"
    FormType="DefinitionForm" Descriptor="Change" DescriptorState="#"/>
    <DBLogInfo Duration="0" Parameter="#" TimeStamp="05-Mar-2001
    11:58:46" Identifier="3889340592" StatusType="DRACK"
    Description="Ack: Accept" StatusValue="00" TimeFoldingInd="false"/>
    <DefineReport MapperID="7">
        <Link LinkID="1"/>
    </DefineReport>
</SECSMessage>
<SECSMessage>
    <Header ID="1" IsError="false" SECSMsg="S6F11"
    FormType="Data Form" Descriptor="GotEvent" DescriptorState="#"/>
    <DBLogInfo Duration="#" Parameter="#" TimeStamp="05-Mar-2001
    12:15:38" Identifier="3889340598" StatusType="#" Description="#"
    StatusValue="#" TimeFoldingInd="false"/>
    <Variable Name="V1" ReportID="7" VariableID="1">
        <Value Name="V1" Format="U4" Length="1">3</Value>
    </Variable>
</SECSMessage>
```

In these examples, the "Time Folding Ind" is used to flag a discontinuity in time, such as a shift out of daylight savings time, which could make a response appear to precede a query. The "#" symbol is a filler or null value.

The process of converting structured messages into structure tagged messages is straight forward. A very short routine can accomplish the conversion. Optionally, error checking can be added to the conversion process and the routine expanded. However, standard tools can be applied to error checking, including format checking and data validation, if the checking is postponed until the structured messages are fully translated into context tagged XML messages.

Figure 3:
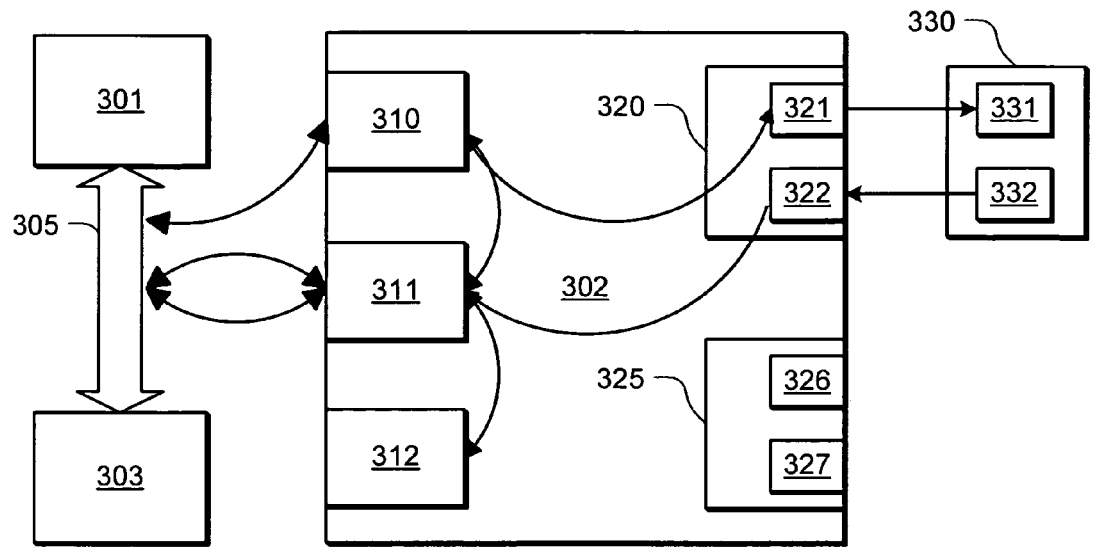
FIG. 3 is a block diagram including a device for listening to and translating communications between devices.
Figure 4:
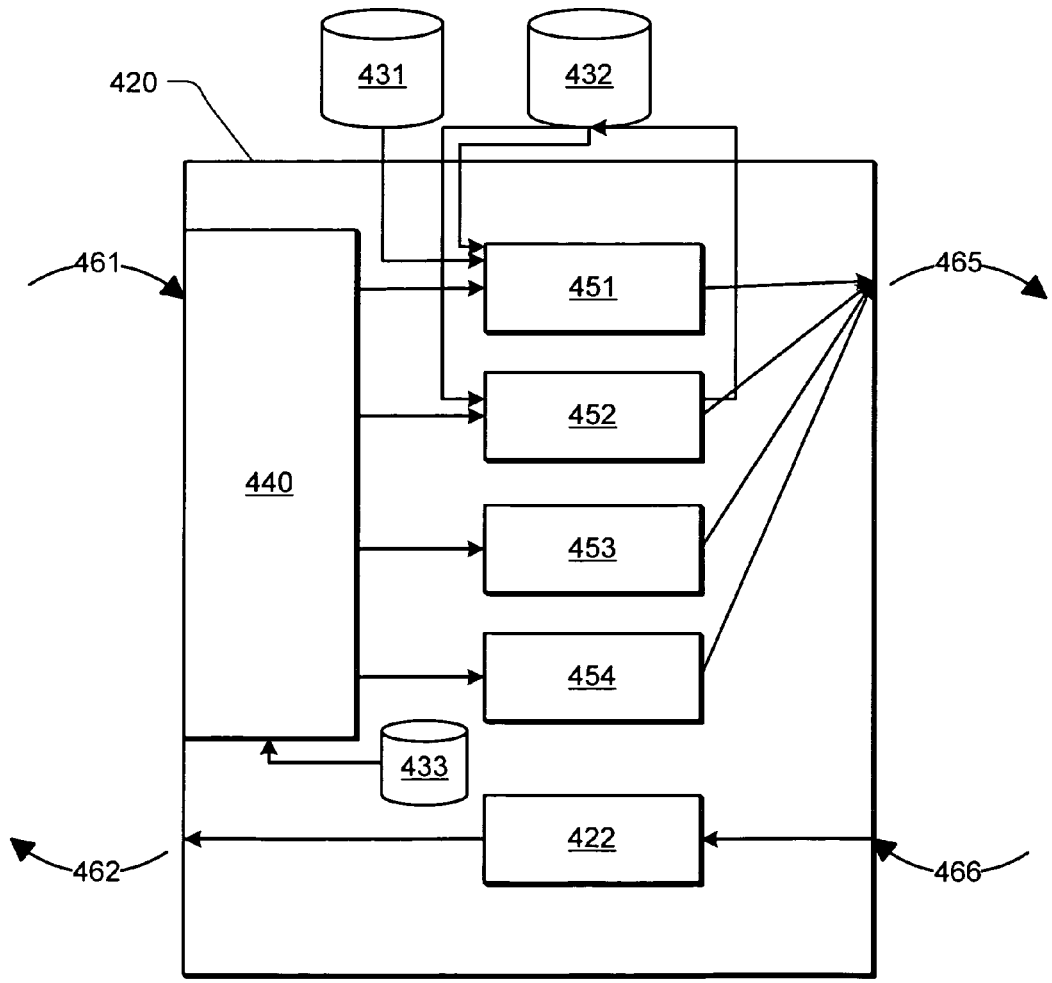
FIG. 4 is a block diagram of the second phase of a two-phase translation process.

The process of converting structure tagged messages into context tagged messages is more involved. Context can come from context-setting messages or from context tables, which may be constructed from context-setting messages or the results of context-setting messages, e.g., values received by the machines in context-setting messages, stored by the machines and revealed in response to inquires. Additional useful information can come from dictionaries. FIGS. 3 and 4 illustrate converting structured messages into structure tagged messages.

FIG. 3 depicts a host 301 and a machine 303 in communication across media 305. The media may support serial communications, an Ethernet link or any other suitable method for communicating between host and machine. The communications protocol across the media may be SECS I, HSMS or any other suitable transport protocol. The system 302 taps into the communication media 305, for instance, in one out of the ways depicted in FIGS. 2A-2C. When the mode depicted in FIG. 2C is used, for instance, both an HSMS and SECS I session will be open. Logic and resources are provided for mapping messages from one transport format to another and, optionally, to keep two sessions open at the same time. The system 302 includes physical ports 310, 311, 312 and logical ports 320, 325. The physical ports may handle different modes of communication. For instance, a pair of physical ports may handle serial communications and another may handle Ethernet communications. The physical ports 310, 311, 312 may be connected with logical ports, e.g., 320. There may be a plurality of logical ports 320, 325. A logical ports may support bi-directional translation from structured to structure tagged to context tagged messages, and back again. In this illustration, translation from structured to context tagged messages is illustrated by blocks 321 & 326. Reverse translation is illustrated by blocks 322 & 327. Alternatively, separate logical ports could be assigned for the different directions of translation. The system may usefully provide translation only from SECS to a context tagged format. Error checking capabilities may be provided, if desired. Failures in the communication layer may be reported to a logger. In addition, an error message may be sent to the receiver. Translations may be communicated to an observer 330, for instance, using SOAP (Simple Object Access Protocol.) The observer may have separate facilities for receiving context tagged messages 331, translated from a structured message by translator 321, and for sending a structure tagged message is 332 to be translated by translator 322. The translation process is illustrated in greater detail in the following figure.

FIG. 4 depicts the second phase of translation to and from context tagged message format. Structure tagged messages 461 are processed by the system 420 to produce context tagged messages 465. Conversely, context tagged messages 466 are translated by module 422 into structure tagged messages 462. One or more common logic modules 440 process an incoming structure tagged message. (Not illustrated in the figure is the first phase of translation, in which a structured message is translated into structure tagged message.)

In the second phase of translation, a number of steps may be carried out which do not depend on the form of message received. The resources available for processing incoming messages include the dictionary 431, a dynamic mapper 432, and various tables 433. The dictionary is described above.

The dynamic mapper records definitions of reports (links to variables), of traces (links to variables) and of events (links to reports or to datasets.)

```
<FormMappers>
  <Reports>
    ...
    <Mapper MapperID="7">
      <Link LinkID="1"/>
    </Mapper>
  </Reports>
  <EventLinks>
    <Mapper MapperID="1">
      <Link LinkID="7"/>
      <Link LinkID="2"/>
    </Mapper>
    <Mapper MapperID="10">
      <Link LinkID="11"/>
    </Mapper>
    <Mapper MapperID="11">
      <Link LinkID"12"/>
    </Mapper>
  </EventLinks>
  ...
</FormMappers>
```

Reports and EventLinks provide 1 to many connections, between reports and variables and between events and reports, respectively. In this example, report 7 is linked to variable 1 and event 1 is linked to reports 7 and 2. Event 1 is set to trigger report 7 including variable 1 and report 2 which is not defined in the excerpt shown.

The tables include a primary/secondary table, a name cross reference table and a message format table. One of the tables can be used to relate primary and secondary messages as illustrated by the following primary/secondary table excerpt:

| Session | | | Empty |
|---------|-----------|-----|-------|
| Primary | Secondary | Ack | List  |
| Data Form Sessions | | | |
| S1F3    | S1F4      |     | ✓     |
| S2F13   | S2F14     |     | ✓     |
| S2F15   | S2F16     | ✓   |       |
| Definition Form Sessions | | | |
| S2F23   | S2F24     | ✓   |       |
| S2F33   | S2F34     | ✓   | ✓     |
| S2F35   | S2F36     | ✓   | ✓     |

In this table, primary and secondary messages are associated with each other. The acknowledgment column marks the existence of an acknowledgment value that can be either a success or failure acknowledgment. The empty list column indicates a session that can include an empty variable list. In addition, a column can be provided which indicates that certain fields in the tagged message may be different from one session to another. Examples are provided for both data form sessions and definition form sessions. The data form sessions include an inquiry, which sets a context, and a response. The definition form sessions set contexts for later reporting, such as defining a report, an event, a trace or a data set. Additional session types include log only form sessions and time form sessions. The log only form sessions include messages that are not processed as data or definitions, but are only logged. The time form sessions include special messages which reflect resetting of the clock running on a machine. These messages are useful when the clock needs to be set back to be accurate or when hours are gained or lost due to daylight savings time.

Another useful table is a name cross-reference table. The name cross-reference table can be used to differentiate between message types that validly can originate with either a host or a machine. A combination of source, which is associated with either a host or machine, and message type can be translated into a differentiated message type. The entries below include one of our examples and an instance in which the handling of a message type (its mapper name or differentiated message type) depends on where it originated.

```
<Port PortID="1" PortType="Host">
  ...
  <Message Name="S7F3" MapperName="S7F3_H" MainDestPort="2">
    <DestPortID>0</DestPortID>
  </Message>
  ...
</Port>
<Port PortID="2" PortType="Equipment">
  <Message Name="S1F4" MapperName="S1F4" ReturnToSender="True">
    <DestPortID>0</DestPortID>
  </Message>
  ...
  <Message Name="S7F3" MapperName="S7F3_E" MainDestPort="1">
    <DestPortID>0</DestPortID>
  </Message>
  ...
</Port>
```

The mapping of the S7F3 message in this example depends on whether it originated with the host (S7F3_H) or the equipment (S7F3_E).

A third useful table is the message format table.

```
<Mapper Name="S1F4" Reply="false" WaitForAck="false"
FormType="DataForm" Descriptor="QuerySimpleReply"
TransactionInfo="Reply">
    <Structure Format="L" KnownLength="false" ZeroAction="CutMessage">
        <Value Format="Unknown" SpecialItem="Variable" Duplicated="true"/>
    </Structure>
</Mapper>
<Mapper Name="S6F11" Reply="Optional" WaitForAck="false"
FormType="DataForm" Descriptor="GotEvent" TransactionInfo="CreateDoc">
    <Structure Format="L" KnownLength="true" Length="3">
        <Value IrrelevantItem="true"/>
        <Value Format="DataItem" Type="CEID" SpecialItem="EventID"
            TagID="ID"/>
        <Value Format="L" KnownLength="false" ZeroAction="NoReportLink"
        SpecialItem="Event">
            <Value Format="L" KnownLength="true" Length="2"
            Duplicated="true">
                <Value Format="DataItem" Type="RPTID"
                SpecialItem="ReportID"/>
                <Value Format="L" KnownLength="false" SpecialItem="Report">
                    <Value Format="Unknown" Duplicated="true"
                    SpecialItem="Variable"/>
                </Value>
            </Value>
        </Value>
    </Structure>
</Mapper>
```

Two useful tools for manipulating data structures used during the second phase of translation are with document object model (DOM) tools and the C++ standard template library (STL). Those of ordinary skill in the art will recognize that many other ways of manipulating data structures are substantially equivalent: for instance, SAX (Simple API for XML) has a different origin than DOM, but is substantially equivalent to DOM. DOM is a platform- and language-neutral interface that permits script to access and update the content, structure, and style of a document. It includes an application programming interface (API) for well-formed XML documents. It defines the logical structure of documents and ways that a document can be accessed and manipulated. In the DOM specification, the term "document" is used in a broad sense. Increasingly, XML is being used as a way of representing many different kinds of information that may be stored in diverse systems, and much of this would traditionally be seen as data rather than as documents. Nevertheless, XML presents this data as documents, and the DOM may be used to manage this data. The DOM interface enables those practicing aspects of the present invention to build documents, navigate their structure, and add, modify, or delete elements and content. Tools for practicing DOM are provided by Microsoft and others.

The Standard Template Library, or STL, is a C++ library of container classes, algorithms, and iterators; it provides many of the basic algorithms and data structures of computer science. The STL is a generic library, having components that are heavily parameterized: almost every component in the STL is a template. Other data manipulation libraries will be equivalent to STL; many of them are extensions of STL provided by various vendors. DOM and STL can be mixed and matched. For instance, the dictionary and message format table could be implemented using DOM, leaving the name cross reference table and the dynamic mapper to be implemented using STL.

The second phase translation steps may be traced from when an input buffer is filled with a structure tagged message 461. (Not all of these steps will be needed to practice the present invention.) Some steps are followed regardless of the so-called "form" of the structure tagged message 440. The incoming message is identified as a primary or secondary message, using the primary/secondary table or some other data structure. A primary message is given a timestamp and unique identifier, both of which are useful if the context tagged messages are stored in a database. A secondary message is associated with a previously received primary message. A transaction ID or similar matching field can be used to match the secondary message with its primary message. The incoming structure tagged message is translated from XML into a DOM tree. The SECS-II message name is retrieved from the tree. This message name and the source of the message are used to access the name cross-reference table, to find a differentiated message name. The differentiated message name is used to locate the appropriate message format entry in the message format table. The appropriate message format entry includes a form type, such as data form or definition form, which can be used to control processing in addition to the steps common to all form types. Again for a secondary message, a primary message structure is stored for the session closing secondary message. The message format entry is used to parse the incoming structure tagged message. The structures of these two data structures can be matched. At this stage, the incoming message may be classified as a publishable context tagged message. For instance, a primary message with no wait bit (requesting an acknowledgement) or a primary message with a meaningless acknowledgement (e.g., S6F11) or with a secondary message may be a candidate for publication.

Processing beyond the common steps 440 proceeds according to the form type of the incoming message. Separate modules or segments of logic may process data forms 451, definition forms 452, log only forms 453 and time forms 454, before publishing a context tagged message 465.

The data structures and program steps described above can be combined into a variety of useful embodiments. In one embodiment, a data stream is translated into semantically tagged messages. The incoming data stream includes structured messages. Structured messages have a clearly defined format. Structured message protocols typically include a variety of message formats. The format of the message typically depends on a message type identifier, such as a value in a field in the first part of the message. In this particular embodiment, the data stream includes both context-setting and context-sensitive messages. Context-setting messages may ask the question or define a report to be generated in response to an event or a request. The context-sensitive message in this embodiment is only meaningful when matched with the corresponding context-setting message. One reason for a context-sensitive message to be only meaningful is that the question is not repeated with the answer. Alternatively, the user may define a special, custom report format that is not hard coded into a translation program. The data stream is received and structured messages are tagged with XML tags corresponding to the structure of the messages. This tagging step does not require matching of context-setting and context-sensitive messages. These XML structure tagged messages can then be processed the standard tools for processing XML formatted messages. XML tagged context-setting messages can be matched with the corresponding XML tagged context-sensitive messages. The one or more matching fields are useful in this matching process. In this embodiment, matched messages can be utilized to generate context-insensitive XML messages. Questions asked or report formats defined in the context-setting messages can be used to create corresponding XML tags. Alternatively, a dictionary or other external reference can be consulted to create context-sensitive XML tags. A dictionary may be a cross-reference table or other data structure, which may be in RAM or on disk. To create context tagged messages, the intermediate, structure tagged messages can be modified or new messages can be created. Messages created in either way can be referred to as retagged messages. The retagged messages are output. Standard tagging schemes other than XML can be used, either standards in effect at the time of this invention or later developed standards.

The structured messages of this embodiment may be SECS-compliant. Alternatively, they may be HL7-compliant or DIACOM-compliant. Structured messages in integrated circuit manufacturing fabs, metal cutting shops, health-care facilities and many other environments can be processed in accordance with the present invention.

One adaptation of this embodiment involves context-setting messages that include variable identifiers for variables to be reported and context-setting messages that report variable values for those variables, without repeating the identifiers. The variable identifiers in the context-setting messages can be used to create corresponding XML labels. This may be a simple as copying the identifiers from the context-setting messages into context-in sensitive messages. Alternatively, the identifiers from the context-setting messages can be used to look up names of variables from a dictionary or other external reference. Names, instead of identifiers, can be used as XML labels. A further alternative would be to use the identifiers to look up XML labels and names for variables and to nest the names of the variables within the context of the XML labels. Both short labels and full names or descriptions of variables could be provided in the context-insensitive messages.

Another adaptation of this embodiment involves one or more context-setting messages that include report definitions and triggering events. The report definitions and triggering events may be included in the same message or in different messages. The report definition messages include identifiers of variables to be reported. The definition of the triggering events and identifiers of the reports triggered may be included the same or in different messages. Triggering events may be defined by a complex expression set forth in more than one message. The triggering event can be associated with one or more reports. When the triggering event takes place, one or more messages can be used report both the current to the triggering event and values of variables belonging to the triggered reports. The identifiers of the triggered reports can be included in the context-sensitive messages or can be omitted from the context-sensitive messages. If the identifiers of the triggered reports are included, they can be copied as XML labels are into a context-insensitive message. Alternatively, report identifiers can be used to access a dictionary or other external reference to obtain XML labels or report names to be used as XML labels. When identifiers of the triggered reports are omitted from the context-sensitive messages, the identifier of the triggering event can be used to access a dictionary or other external reference and recall the reports triggered and the variables included in those reports. The identifier of the report triggered or an XML label or name associated with the report can be used for generating XML tags for the context-insensitive message.

While the preceding examples are cast in terms of a method, devices and systems employing this method are easily understood. A magnetic memory containing a program capable of practicing the claimed method is one such device. A computer system having memory loaded with a program practicing the methods described is another such device.

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

We claim as follows:

1. An improved method of generating XML tagged messages from multiple types of structured, non-XML messages, received by a computer system operating one or more translation programs and subjecting the messages received to format checking and data validity checking, the improved method including:

tagging the structured, non-XML messages with XML tags corresponding to the structure of the messages;

interpreting content and the structure of the structure tagged message to identify fields of the structure tagged messages;

generating field tagged messages from the structure tagged messages, said field tagged messages having XML tags corresponding to the identified fields of the structure tagged messages; and checking the field tagged messages for data format and data validity checking utilizing tools adapted to XML formatted messages.

2. The method of claim 1, further including accessing a dictionary that includes variable names corresponding to the variables identifiers, and generating XML tags corresponding to the variable names.

3. A improved method of generating XML tagged messages from multiple types of structured, non-XML messages, received by a computer system operating one or more translation programs and subjecting the messages received to business logic processing, the improved method including:

tagging the structured, non-XML messages with XML tags corresponding to the structure of the messages;

interpreting content and the structure of the structure tagged message to identify fields of the structure tagged messages;

generating field tagged messages from the structure tagged messages, said field tagged messages having XML tags corresponding to the identified fields of the structure tagged messages; and applying business logic processing to the field tagged messages utilizing tools adapted to processing XML formatted messages.

4. The method of claim 3, wherein tagging of structured, non-XML messages to form field tagged messages precedes applying business logic processing to data in the structured, non-XML message.

5. A device, including:

memory;

a processor connected to the memory; and logic and resources operative on the processor and memory, adapted to carry out the method of claim 1.

6. A device, including:

memory;

a processor connected to the memory; and logic and resources operative on the processor and memory, adapted to carry out the method of claim 3.

* * * * *